(12) United States Patent
Takahashi

(10) Patent No.: US 10,718,740 B2
(45) Date of Patent: Jul. 21, 2020

(54) ULTRASONIC TEST SYSTEM, ULTRASONIC TEST METHOD AND AIRCRAFT STRUCTURAL OBJECT

(71) Applicant: FUJI JUKOGYO KABUSHIKI KAISHA, Tokyo (JP)

(72) Inventor: Kohei Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 325 days.

(21) Appl. No.: 15/410,220

(22) Filed: Jan. 19, 2017

(65) Prior Publication Data

US 2017/0248550 A1 Aug. 31, 2017

(30) Foreign Application Priority Data

Feb. 29, 2016 (JP) .................. 2016-037512

(51) Int. Cl.
*G01N 29/24* (2006.01)
*G01H 9/00* (2006.01)
(Continued)

(52) U.S. Cl.
CPC ........... *G01N 29/041* (2013.01); *G01H 9/004* (2013.01); *G01N 29/11* (2013.01); *G01N 29/221* (2013.01);
(Continued)

(58) Field of Classification Search
CPC ............. G01N 29/041; G01N 29/2418; G01N 29/4436; G01N 29/221; G01N 29/2462; G01N 29/11; G01N 2291/044; G01N 2291/2694; G01N 2291/106; G01N 2291/015; G01N 2291/0231; G01N 2291/0427; G01N 2291/101; G01H 9/004
(Continued)

(56) References Cited

U.S. PATENT DOCUMENTS 4,688,429 A * 8/1987 Holroyd ................. G01R 23/17
73/579
5,217,018 A * 6/1993 Dias ..................... A61B 8/0833
333/154
(Continued)

FOREIGN PATENT DOCUMENTS

CN 102192954 A 9/2011
CN 102869987 A 1/2013
(Continued)

OTHER PUBLICATIONS

European Office Action dated Jul. 1, 2018, in European Patent Application No. 17 152 825.0 (7 pages).
(Continued)

*Primary Examiner* — Jacques M Saint Surin
(74) *Attorney, Agent, or Firm* — Smith, Gambrell & Russell, LLP

(57) ABSTRACT

According to one implementation, an ultrasonic test system includes an ultrasonic propagating body and an optical fiber sensor. The ultrasonic propagating body changes at least one traveling direction of at least one ultrasonic wave which propagates in a test target. The optical fiber sensor detects the at least one ultrasonic wave of which the at least one traveling direction has been changed by the ultrasonic propagating body.

16 Claims, 16 Drawing Sheets

(51) Int. Cl.
*G01N 29/11* (2006.01)
*G01N 29/22* (2006.01)
*G01N 29/44* (2006.01)
*G01N 29/04* (2006.01)

(52) U.S. Cl.
CPC ..... *G01N 29/2418* (2013.01); *G01N 29/2462* (2013.01); *G01N 29/4436* (2013.01); *G01N 2291/015* (2013.01); *G01N 2291/0231* (2013.01); *G01N 2291/044* (2013.01); *G01N 2291/0427* (2013.01); *G01N 2291/101* (2013.01); *G01N 2291/106* (2013.01); *G01N 2291/2694* (2013.01)

(58) Field of Classification Search
USPC .......................................................... 73/602
See application file for complete search history.

(56) References Cited

U.S. PATENT DOCUMENTS

| | | | | |
|---|---|---|---|---|
| 6,047,602 | A * | 4/2000 | Lynnworth | G01F 1/662 |
| | | | | 73/632 |
| 6,543,288 | B1 | 4/2003 | Blouin et al. | |
| 7,131,331 | B2 * | 11/2006 | Bates | G01N 25/72 |
| | | | | 73/589 |
| 9,052,273 | B2 | 6/2015 | Michaut | |
| 9,439,626 | B2 | 9/2016 | Nakanishi | |
| 9,625,423 | B2 | 4/2017 | Bossi et al. | |
| 10,054,568 | B2 | 8/2018 | Soejima et al. | |
| 2011/0259104 | A1 * | 10/2011 | Hattori | G01N 29/043 |
| | | | | 73/600 |
| 2013/0129275 | A1 | 5/2013 | Giurgiutiu et al. | |
| 2013/0333472 | A1 * | 12/2013 | Georgeson | G01N 29/2418 |
| | | | | 73/584 |
| 2014/0255023 | A1 * | 9/2014 | Kishida | G01H 9/004 |
| | | | | 398/21 |
| 2015/0059479 | A1 * | 3/2015 | Davis | G01N 29/28 |
| | | | | 73/644 |
| 2015/0247826 | A1 * | 9/2015 | Soejima | G01N 29/2418 |
| | | | | 73/643 |
| 2016/0274062 | A1 * | 9/2016 | Takahashi | B23P 6/00 |
| 2016/0363562 | A1 * | 12/2016 | Takahashi | G01N 29/043 |

FOREIGN PATENT DOCUMENTS

| | | | | |
|---|---|---|---|---|
| CN | 103654850 | A | 3/2014 | |
| CN | 103792191 | A | 5/2014 | |
| EP | 0 397 960 | A1 | 11/1990 | |
| JP | 2005098921 | * | 4/2005 | ............ G01N 29/08 |
| JP | 2005-257289 | | 9/2005 | |
| JP | 2006-132952 | | 5/2006 | |
| JP | 2007-240447 | | 9/2007 | |
| JP | 2013-029460 | | 2/2013 | |

OTHER PUBLICATIONS

Lee, J.-R., et al. A novel fiber Bragg grating acoustic emission sensor head for mechanical tests. Scripta Materials. 2005. vol. 53, pp. 1181-1186.
Translation of First Japanese Office Action dated Jun. 27, 2017, in Japanese Patent Application No. JP 2016-037512.
First Japanese Office Action dated Jun. 27, 2017, in Japanese Patent Application No. JP 2016-037512 (3 pages in Japanese).
Chinese Office Action dated Aug. 21, 2018, in Chinese Patent Application No. 201611260979.1 (8 pages in Chinese—Machine translation is not yet available).
Extended European search report dated Aug. 7, 2017, in Patent Application No. 17 152 825.0.
Guo, H. et al. Fiber Optic Sensors for Structural Health Monitoring of Air Platforms. Sensors, vol. 11, No. 12, 2011, pp. 3687-3705.
Culshaw, B et al. The Detection of Ultrasound Using Fiber-Optic Sensors. IEEE Sensors Journal, vol. 8, No. 7, 2008, pp. 1360-1367.
Second Chinese Office Action dated Feb. 21, 2019, in Chinese Patent Application No. 201611260979.1 (5 pages in Chinese with English translation).
English translation of the First Chinese Office Action dated Aug. 21, 2018, in Chinese Patent Application No. 201611260979.1 (7 pages).
Office Action dated Jun. 25, 2019, 2019, in Chinese Patent Application No. 201611260979.1 (7 pages in Chinese with English translation).

* cited by examiner

ULTRASONIC TEST SYSTEM, ULTRASONIC TEST METHOD AND AIRCRAFT STRUCTURAL OBJECT

CROSS REFERENCES TO RELATED APPLICATIONS

This application is based upon and claims the benefit of priority from Japanese Patent Application No. 2016-037512, filed on Feb. 29, 2016; the entire contents of which are incorporated herein by reference.

FIELD

Implementations described herein relate generally to an ultrasonic test system, an ultrasonic test method and an aircraft structural object.

BACKGROUND

Conventionally, ultrasonography is known as a method of nondestructively inspecting a structural member of an aircraft or the like. Furthermore, a technique using an FBG (fiber Bragg grating) sensor as a sensor for ultrasonic testing is also known (for example, refer to Japanese Patent Application Publication JP 2005-257289 A and Japanese Patent Application Publication JP 2006-132952 A). Using an FBG sensor as a sensor for receiving an ultrasonic wave can improve detection accuracy of ultrasonic waves compared to a case where an ultrasonic transducer is used as the sensor.

However, an FBG sensor has reception directivity. Specifically, an FBG sensor can only receive an ultrasonic wave, which propagates toward the approximately longitudinal direction of the fiber. Thereby, when an FBG sensor is used as a sensor for receiving an ultrasonic wave, it is difficult to highly accurately receive not only an ultrasonic wave propagating from the perpendicular direction to the longitudinal direction of the FBG sensor, but also an ultrasonic wave propagating from a direction inclined by more than a certain angle to the longitudinal direction of the FBG sensor.

Therefore, when it is difficult to dispose many FBG sensors or to secure a space for disposing an FBG sensor, there is a problem that an ultrasonic wave cannot be detected using an FBG sensor. Conversely, even when an FBG sensor is disposed, an ultrasonic wave can be detected only in a limited range.

In particular, when a target of an ultrasonic test is an aircraft structural object having reinforcement members, such as spars, ribs, and stringers, attached on a panel (which is also called a skin), it may be difficult to secure a space for disposing an FBG sensor due to interference with the many reinforcement members and cables.

Thus, an object of the present invention is to allow detecting ultrasonic waves with higher accuracy in ultrasonography, without being restricted by the reception directivity of a sensor for receiving an ultrasonic wave and/or a space for disposing the sensor for receiving an ultrasonic wave.

SUMMARY OF THE INVENTION

In general, according to one implementation, an ultrasonic test system includes an ultrasonic propagating body and an optical fiber sensor. The ultrasonic propagating body changes at least one traveling direction of at least one ultrasonic wave which propagates in a test target. The optical fiber sensor detects the at least one ultrasonic wave of which the at least one traveling direction has been changed by the ultrasonic propagating body.

Further, according to one implementation, an aircraft structural object to which the above-mentioned ultrasonic test system has been attached is provided.

Further, according to one implementation, an ultrasonic test method includes: changing at least one traveling direction of at least one ultrasonic wave, propagating in the test target, by disposing an ultrasonic propagating body on a test target; and detecting the at least one ultrasonic wave, of which the at least one traveling direction has been changed by the ultrasonic propagating body, by an optical fiber sensor.

Further, according to one implementation, an ultrasonic test method includes: disposing an optical fiber sensor on a surface of a test target in a direction where a length direction of the optical fiber sensor is not parallel to the surface of the test target; and detecting at least one ultrasonic wave by the optical fiber sensor. The at least one ultrasonic wave propagates in the test target.

DETAILED DESCRIPTION

An ultrasonic test system, an ultrasonic test method and an aircraft structural object according to implementations of the present invention will be described with reference to the accompanying drawings.

First Implementation (Structure and Function)

Figure 1:
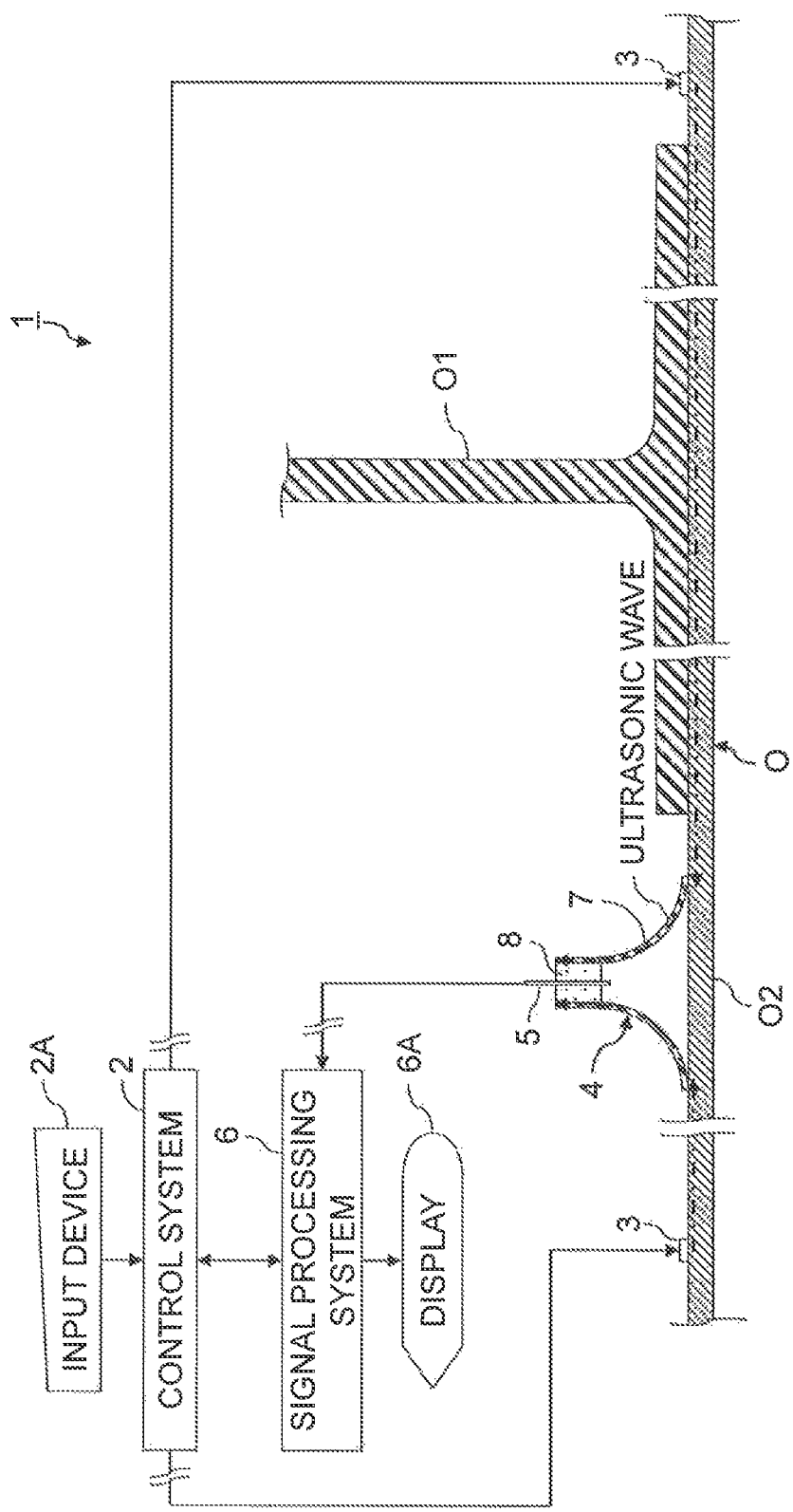
FIG. 1 shows a structure of an ultrasonic test system according to the first implementation of the present invention.
Figure 2:
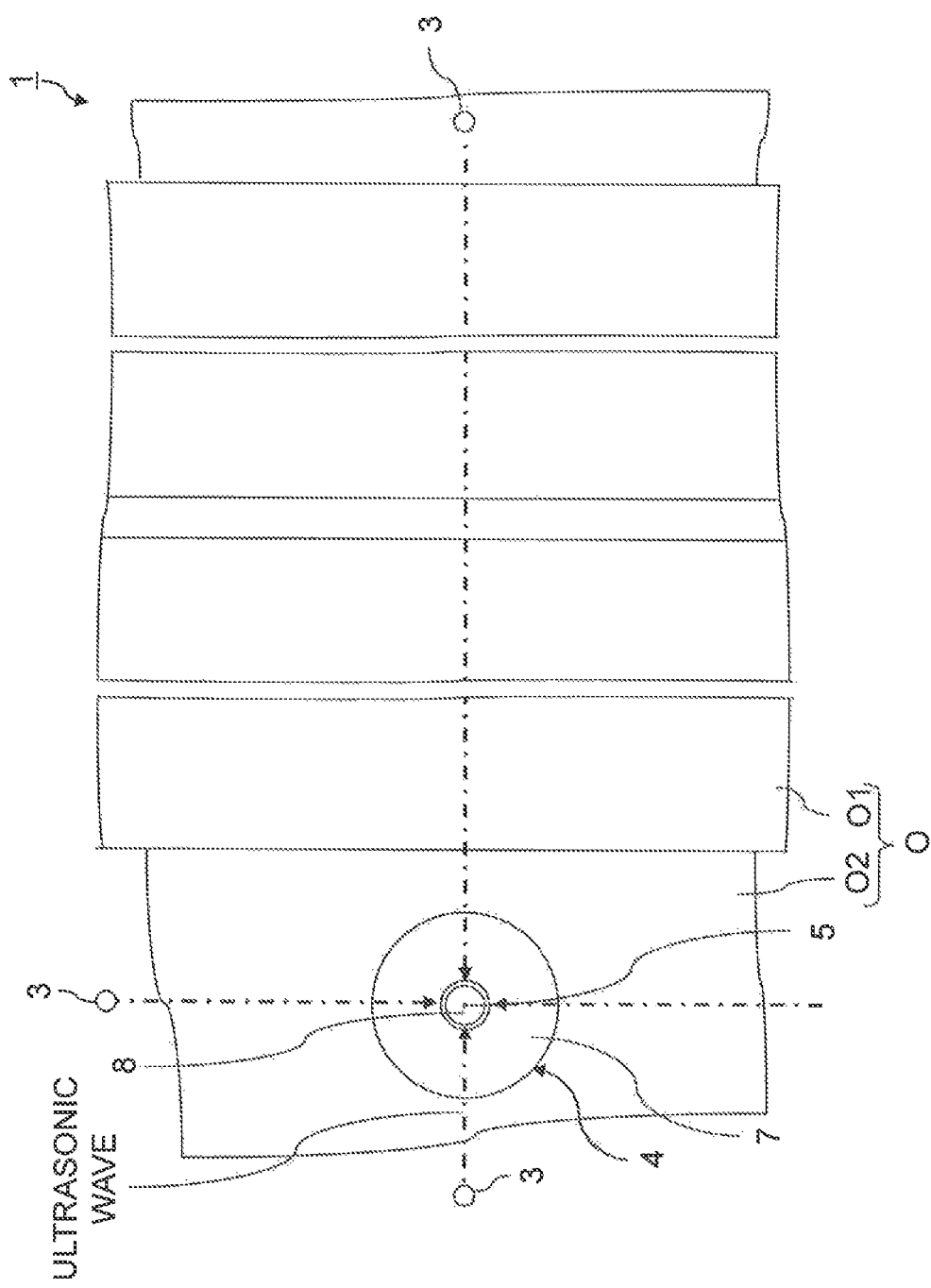
FIG. 2 is a top view of main elements of the ultrasonic test system shown in FIG. 1.

FIG. 1 shows a structure of an ultrasonic test system according to the first implementation of the present invention. FIG. 2 is a top view of main elements of the ultrasonic test system shown in FIG. 1.

An ultrasonic test system 1 performs a non-destructive test of a test target O using ultrasonic waves. Examples of the test target O include a structural object composing a moving object, such as a rail vehicle, a spacecraft, an automobile, a ship, a blade of a windmill besides an aircraft. As a matter of course, a building may also be the test target O.

In particular, it is important to periodically inspect the existence of damage in an aircraft structural object which requires high safeness. Thus, an aircraft structural object, to which the ultrasonic test system 1 has been attached as a part, can also be produced. Specifically, the ultrasonic test system 1 can be attached to an aircraft structural object constantly, and periodically inspect the existence of a defect, such as damage, in the aircraft structural object. In that case, the test target O is a part composing the aircraft structural object. In an aircraft structural object, it is especially important to detect peeling at an adhesive portion between parts bonded with fasteners or an adhesive.

For example, when a wing structural object having reinforcement members, such as spars, ribs, and stringers, attached on a panel is the test target O, the panel itself and a bonded portion between the panel and a reinforcement member can be a detection target of the existence of a defect, such as damage or peeling. In the example shown in the figures, a panel O2 to which a stringer O1 has been attached is the test target O.

When the test target O is an aircraft structural object, such as the panel O2 to which the stringer O1 has been attached, a material of the test target O is a composite material, such as GFRP (glass fiber reinforced plastics) or CFRP (carbon fiber reinforced plastics), or metal, such as aluminum or magnesium.

The ultrasonic test system 1 can be composed of a control system 2, at least one actuator 3, an ultrasonic propagating body 4, an optical fiber sensor 5, and a signal processing system 6.

The control system 2 is a circuit for controlling the actuator 3 so that an ultrasonic wave is transmitted from the actuator 3. Elements, which process digital information, out of the control system 2 can be composed of a computer circuit. Furthermore, an input device 2A can be coupled to the control system 2 so that a user can manually perform necessary operations.

The actuator 3 is an ultrasonic transducer which emits ultrasonic waves toward the test target O and the ultrasonic propagating body. Specifically, the actuator 3 is a piezoelectric element, such as a piezoelectric ceramic, which converts a control signal output from the control system 2 into an ultrasonic wave and transmits the ultrasonic wave. Positions and the number of the actuators 3 can be preferably determined according to a test area. In the example shown in the figures, the four actuators 3 have been disposed so as to surround the test area of the panel O2 to which the stringer O1 has been attached.

The ultrasonic propagating body 4 is an attaching part for attaching the optical fiber sensor 5, used as a sensor for detecting ultrasonic waves which propagate in the test target O, indirectly on a surface of the test target O, in particular, the ultrasonic propagating body 4 has a structure which allows changing the traveling directions of ultrasonic waves, which propagate in the test target O. Thus, the ultrasonic propagating body 4 also serves as a medium for propagating ultrasonic waves.

The optical fiber sensor 5 detects ultrasonic waves, which propagate in the test target O. The optical fiber sensor 5 is attached indirectly on the surface of the test target O through the ultrasonic propagating body 4. Therefore, the optical fiber sensor 5 detects an ultrasonic wave whose traveling direction has changed by the ultrasonic propagating body 4.

The optical fiber sensor 5 can detect at least one of an ultrasonic wave, which has transmitted a defect existing inside the test target O, and an ultrasonic wave, which has reflected on the defect, according to algorithm for detecting the defect. That is, the optical fiber sensor 5 can detect at least one of an ultrasonic transmitted wave, which has transmitted a defect, and an ultrasonic reflected wave, which has reflected on the defect.

Therefore, the optical fiber sensor 5 is disposed at a position where at least one of an ultrasonic transmitted wave and an ultrasonic reflected wave, which propagate in the test target O, from a test area can be detected. In the example shown in the figures, the optical fiber sensor 5 has been disposed at the center of the test area surrounded by the four actuators 3.

Typical examples of the optical fiber sensor 5 include a PS-FBG (phase-shifted FBG) sensor besides an FBG sensor. An FBG sensor detects an ultrasonic wave by detecting a change of light transmission characteristics or light reflection characteristics of an FBG, which varies due to strain change caused by vibration propagating in the test target O, as an optical signal. Meanwhile, a PS-FBG is an FBG in which a local phase shift has been introduced in a periodic change of a refractive index. Therefore, when a PS-FBG sensor is used, detection sensitivity of ultrasonic waves can be dramatically improved, compared to a case where an FBG sensor is used.

In the optical fiber sensor 5, such as an FBG sensor and a PS-FBG sensor, a strain change due to ultrasonic vibration is detected, as an optical signal, using a change of optical characteristics due to minute expansion and contraction in the length direction of the fiber. Thus, ultrasonic waves, which propagate in the length direction of the optical fiber sensor 5, can be detected with satisfactory accuracy. Meanwhile, it is difficult to detect ultrasonic waves, which propagate in a direction perpendicular to the length direction of the optical fiber sensor 5, with satisfactory accuracy. That is, the optical fiber sensor 5 has reception directivity. Thereby, bringing the length direction of the optical fiber sensor 5, which is a change direction of optical characteristics, as close as possible to a propagation direction of ultrasonic waves leads to improvement in the detection accuracy of the ultrasonic waves in order to detect the ultrasonic waves using the optical fiber sensor 5.

On the condition that the optical fiber sensor 5 is attached on the surface of the test target O with an adhesive or the like by the conventional method, the length direction of the optical fiber sensor 5 becomes parallel to the surface of the test target O. Therefore, an area where ultrasonic waves can be detected using the optical fiber sensor 5 is a generally sector-shaped area which spreads at a predetermined angle with centering on the length direction of the optical fiber sensor 5.

By contrast, when the optical fiber sensor 5 is indirectly attached to the test target O through the ultrasonic propagating body 4, the optical fiber sensor 5 can be attached to the test target O in a direction where the length direction of the optical fiber sensor 5 is not parallel to the surface of the test target O. In other words, even when ultrasonic waves, which propagate in the test target O, do not propagate in the length direction of the optical fiber sensor 5, the traveling directions of the ultrasonic waves can be changed to the length direction of the optical fiber sensor 5 by making the ultrasonic propagating body 4 have an appropriate structure.

Thereby, when it is difficult to secure a space for placing the optical fiber sensor 5, the optical fiber sensor 5 can be disposed in a direction where the length direction of the optical fiber sensor 5 is a desired direction. That is, it is possible to obtain flexibility in the direction of the optical fiber sensor 5 which has the reception directivity.

In particular, the optical fiber sensor 5 can be disposed so that the length direction of the optical fiber sensor 5 becomes perpendicular to the surface of the test target O. In this case, one optical fiber sensor 5 can detect ultrasonic waves, which propagate from all directions toward the optical fiber sensor 5, by making the ultrasonic propagating body 4 have an appropriate structure. Specifically, the traveling directions of ultrasonic waves, which propagate in the test target O from a plurality of directions toward the optical fiber sensor 5, can be changed to the same direction according to the reception directivity of the optical fiber sensor 5, by the ultrasonic propagating body 4.

An especially preferable ultrasonic wave is a Lamb wave, from a viewpoint of improving SNR (signal-to-noise ratio) and accuracy of an optical signal which is obtained by the optical fiber sensor 5 as an ultrasonic detection signal. A Lamb wave is a wave propagating in a thin plate of which thickness is not more than half of a wavelength of the ultrasonic wave. Therefore, it is preferable to transmit a Lamb wave from the actuator 3.

On the other hand, it is important to allow the optical fiber sensor 5 to detect an ultrasonic wave in a state where characteristics of a Lamb wave, which propagates in the test target O, have been kept. For that purpose, the ultrasonic propagating body 4 needs to have a structure by which vibration by an ultrasonic wave can propagate from the test target O to the optical fiber sensor 5 in a state where the characteristics of a Lamb wave, which propagates in the test target O, have been kept. When a Lamb wave propagates in a block-shaped medium whose board thickness is relatively thick compared to a wavelength, the characteristics of a Lamb wave are lost.

Thus, the ultrasonic propagating body 4 can be composed of a thin plate 7 for changing the traveling direction of a Lamb wave, which propagates in the test target O, as shown in the figures. In particular, when the thickness of the thin plate 7 is not more than ½ of a wavelength of a Lamb wave, an ultrasonic wave can be led to the thin plate 7 in a state of the Lamb wave. Thereby, the optical fiber sensor 5 can also detect a Lamb wave whose traveling direction has changed by the thin plate 7. As a specific example, in the case of a Lamb wave whose frequency is 100 kHz, a wavelength of the Lamb wave is about 15 mm. Therefore, what is necessary is to set the board thickness of the thin plate 7 to about from 6 mm to 7 mm.

Note that, even when the thickness of the thin plate 7 is thickened more than ½ of a wavelength of a Lamb wave, an ultrasonic wave can be led to the thin plate 7 in a state where the characteristics of a Lamb wave have been kept to some extent. Specifically, there is a relation that the more the thickness of the thin plate 7 is than ½ of a wavelength of a Lamb wave, the more the detection accuracy of an ultrasonic wave by the optical fiber sensor 5 deteriorates since a variation in waveform of the ultrasonic wave becomes larger.

Meanwhile, it may be necessary to thicken the thickness of the thin plate 7 more than ½ of a wavelength of a Lamb wave in order to secure strengths of the thin plate 7. Therefore, as long as the detection accuracy of ultrasonic waves by the optical fiber sensor 5 can be secured, the thickness of the thin plate 7 may be made thicker than ½ of a wavelength of a Lamb wave. That is, the thickness of the thin plate 7 can be determined based on the strengths required for the thin plate 7 and the detection accuracy of ultrasonic waves by the optical fiber sensor 5, so as to fulfill the both conditions. Specifically, the thickness of the thin plate 7 can be determined to be thinner than a thickness necessary for keeping the detection accuracy of ultrasonic waves by the optical fiber sensor 5, and to be thicker than a thickness necessary for securing the strengths.

A material of the thin plate 7 is arbitrary as long as a Lamb wave can propagate in the thin plate 7. As a specific example, the thin plate 7 can be made of a composite material or metal, such as aluminum, titanium, magnesium, or iron.

When the ultrasonic propagating body 4 is composed of the thin plate 7, especially when the ultrasonic propagating body 4 is composed of the cylindrical thin plate 7 whose inside diameter and outside diameter gradually become small from the test target O side toward the optical fiber sensor 5 side as shown in the figures, it becomes possible to change the traveling direction of a Lamb wave, which propagates in the test target O from any 360-degree direction toward the ultrasonic propagating body 4.

Furthermore, when the outside diameter and the inside diameter of the cylindrical thin plate 7 in the optical fiber sensor 5 side are constant and the central axis of the cylindrical thin plate 7 is made perpendicular to the surface of the test target O, the traveling direction of a Lamb wave can be changed to the perpendicular direction to the surface of the test target O. Thereby, the traveling direction of a Lamb wave, which propagates in the test target O, can be changed to the length direction of the optical fiber sensor 5, in a state where the optical fiber sensor 5 has been disposed so that the length direction of the optical fiber sensor 5 becomes perpendicular to the surface of the test target O.

As a more preferred example, a structure of the ultrasonic propagating body 4 can be an upside-down funnel shape whose longitudinal section is a smoothly curved line without an edge. That is, a structure of the ultrasonic propagating body 4 can be seamless. In this case, when the ultrasonic propagating body 4 has a structure in which an end portion of the ultrasonic propagating body 4 in the test target O side are tangent to the surface of the test target O as much as possible, forming an edge, i.e., a portion in which curvature changes discontinuously, can be avoided not only inside the ultrasonic propagating body 4 but also between the surface of the test target O and the ultrasonic propagating body 4. Thereby, an attenuation amount of a Lamb wave propagating toward the optical fiber sensor 5 can be reduced.

When a structure of the ultrasonic propagating body 4 is reverse funnel-shaped as shown in the figures, it is realistic to dispose the optical fiber sensor 5 inside the cylindrical thin plate 7 in the side where the inside diameter of the cylindrical thin plate 7 is small, from a viewpoint of making vibration of the thin plate 7 by a Lamb wave propagate in the optical fiber sensor 5 in an appropriate direction. In other words, it is practical to use an open end of the cylindrical thin plate 7, in the side where the inside diameter of the cylindrical thin plate 7 is small, as an insertion opening for inserting the optical fiber sensor 5, from a viewpoint of enabling to certainly detect even a Lamb wave, propagating from any direction, by the optical fiber sensor 5.

In that case, the optical fiber sensor 5 is fixed to the inner face of the cylindrical thin plate 7 through a medium 8 of a Lamb wave. Specifically, the optical fiber sensor 5 indirectly contacts with the thin plate 7 through the medium 8. A general-purpose adhesive can be used as the medium 8 for fixing the optical fiber sensor 5 to the thin plate 7. Alternatively, a solder may be used as the medium 8. Note that, when the optical fiber sensor 5 is fixed to the thin plate 7 by soldering, it is appropriate to use a low-temperature solder which melts at a temperature at which quality of the optical fiber sensor 5 can be kept.

As another example, the medium 8 can also be made of a columnar and rigid resin, such as plastic. In that case, the optical fiber sensor 5 can be fixed to the ultrasonic propagating body 4 by a method of protecting the optical fiber sensor 5 with a reinforcement tube made of a material, such as stainless steel, having higher strengths than that of the resin, and thrusting the optical fiber sensor 5, protected by the reinforcement tube, into the rigid medium 8, such as plastic.

Note that, it has been confirmed by tests that an ultrasonic wave, such as a Lamb wave, which propagates in the thin plate 7 can be detected by the optical fiber sensor 5 even when the optical fiber sensor 5 has been attached on the thin plate 7 with a commercially available tape. Therefore, the optical fiber sensor 5 may be attached on the ultrasonic propagating body 4 with a tape. For example, when the ultrasonic propagating body 4 is the reverse funnel-shaped thin plate 7 as shown in the figures, the optical fiber sensor 5 may be attached on the thin plate 7 with a tape, in a state where the optical fiber sensor 5 is directly contacted with the inside of the tip of the thin plate 7.

The signal processing system 6 is a circuit for detecting a defect, which may occur in the test target O, based on an ultrasonic detection signal detected by the optical fiber sensor 5. For that purpose, the signal processing system 6 has functions to perform signal processing necessary for detecting a defect, such as noise reduction processing, averaging processing, envelope detection processing, peak detection processing, and threshold processing, besides A/D (analog-to-digital) conversion processing which converts an ultrasonic detection signal from an analog signal into a digital signal. Furthermore, the signal processing system 6 has a function to obtain information necessary for signal processing, such as transmission timing of an ultrasonic wave and information for identifying the actuator 3, from the control system 2.

Elements, which process digital information, out of the signal processing system 6 can be configured by a computer. Furthermore, a display 6A can be coupled to the signal processing system 6 so that information necessary for a user, such as the existence of a defect and a position of the defect, can be displayed.

As described above, the elements, which process electric signals or digital information, out of the control system 2 and the signal processing system 6 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the elements which process digital information. Such a medium may take many forms, including, but not limited to, any type of magnetic medium such as a hard disk, any type of optical medium such as a compact disc (CD) and a digital versatile disk (DVD), any type of semiconductor memory (i.e., semiconductor circuit) such as a volatile memory and a non-volatile memory. The volatile memory may include a dynamic random access memory (DRAM) and a static random access memory (SRAM), and the nonvolatile memory may include a read-only memory (ROM) and a non-volatile random access memory (NVRAM). The ASIC is an integrated circuit (IC) customized to perform, and the FPGA is an integrated circuit designed to be configured after manufacturing in order to perform, all or a part of the functions of the modules shown in FIG. 1.

Examples of a defect include a crack inside a part, or damage or peeling at an adhesive portion or a bonded portion between parts. As described above, a defect may be detected based on a detection signal of an ultrasonic wave which has transmitted a test target area of the test target O. Alternatively, a defect may be detected based on a detection signal of an ultrasonic wave which has reflected on the test target area of the test target O.

For example, an ultrasonic wave, such as a Lamb wave, can be emitted from one certain actuator 3. When a defect exists between the actuator 3 and the ultrasonic propagating body 4, a waveform of an ultrasonic wave, which has transmitted the defect, changes. Specifically, when a defect exists between the actuator 3 and the ultrasonic propagating body 4, a waveform of an ultrasonic wave transmitted from the actuator 3 changes from a waveform of an ultrasonic wave when a defect does not exist. A part of ultrasonic wave, whose waveform has changed, propagate in the ultrasonic propagating body 4, and led to the optical fiber sensor 5 side.

Then, a waveform of ultrasonic transmitted wave, which has transmitted a defect, can be detected by the optical fiber sensor 5.

Therefore, a waveform of an ultrasonic wave when a defect does not exist between the actuator 3 and the ultrasonic propagating body 4 can be previously recorded, as a reference waveform, in the signal processing system 6. Then, the existence of a defect can be determined by comparison processing between the reference waveform and a waveform of an ultrasonic wave which has actually been detected by the optical fiber sensor 5.

The comparison processing between a detected waveform of an ultrasonic wave and a reference waveform can be, for example, threshold processing which determines whether a shift amount between peak positions of the waveforms has exceeded a threshold, or threshold processing which determines whether an index value of an amount of deviation, such as the least square error or a cross-correlation coefficient, between the detected waveform and the reference waveform has exceeded a threshold. Specifically, it can be determined that a defect exists on a propagation path of an ultrasonic wave when it can be determined, by threshold processing of a desired index, that a detected waveform of the ultrasonic wave has changed from a reference waveform. Note that, it is realistic to apply signal processing, such as filter processing for noise removal, averaging processing, and envelope detection processing, to waveform signals before the comparison between the waveforms, from a viewpoint of an improvement in accuracy.

Meanwhile, when an ultrasonic wave, which is transmitted from the actuator 3, passes through under the ultrasonic propagating body 4, and propagates in the test target O, reflects on a defect, a part of ultrasonic reflected wave from the defect propagates in the ultrasonic propagating body 4, and led to the optical fiber sensor 5 side. Then, the waveform of the ultrasonic reflected wave reflected on the defect can be detected by the optical fiber sensor 5. Thereby, as for an ultrasonic reflected wave, the existence of a defect can be detected by comparison between a reference waveform when a defect does not exist and an actually detected waveform, similarly to an ultrasonic transmitted wave.

When an ultrasonic wave has reflected on a defect, a peak which does not originally exist appears in a waveform of the ultrasonic reflected wave. Thereby, when an ultrasonic reflected wave is used for detection of a defect, a position of the defect can also be specified based on the acoustic velocity in the test target O and a period from emission timing of the ultrasonic wave at the actuator 3 to detection timing of a peak of the ultrasonic wave at the optical fiber sensor 5.

Therefore, it can be detected that a defect exists between which actuator 3 and the ultrasonic propagating body 4 when the actuators 3 are disposed on both sides of the ultrasonic propagating body 4 to which the optical fiber sensor 5 has been attached, and ultrasonic waves, such as Lamb waves, are emitted sequentially from the actuators 3, as shown in the figures. It can also be detected that a defect exists between which actuators 3. Furthermore, when an ultrasonic reflected wave from a defect is detected, an approximate position of the defect can also be detected based on a peak time of the ultrasonic reflected wave.

The above-mentioned detection result, in the signal processing system 6, of the existence of a defect and a position of the defect can be displayed on the display 6A, and notified to a user.

(Operation and Action)

Next, an ultrasonic test method of the test target O using the ultrasonic test system 1 will be described.

Firstly, the actuators 3 and the optical fiber sensor 5 are attached on a surface of the test target O, such as an aircraft structural object. The optical fiber sensor 5 is attached on the surface of the test target O using the ultrasonic propagating body 4, such as the thin plate 7 as shown in the figures, having a structure which allows changing a propagation direction of an ultrasonic wave, as an attaching member.

Thereby, the optical fiber sensor 5 can be disposed in a direction where an ultrasonic wave which propagates in the test target O can be detected though the length direction of the optical fiber sensor 5 is not parallel to the surface of the test target O. Preferably, the optical fiber sensor 5 can be disposed so that the length direction of the optical fiber sensor 5 becomes perpendicular to the surface of the test target O. In other words, the ultrasonic propagating body 4 for changing a traveling direction of a part of ultrasonic wave and leading the ultrasonic wave to the optical fiber sensor 5 can be disposed on the test target O so that the optical fiber sensor 5 can be disposed in a desired direction.

Meanwhile, each of the actuators 3 is disposed at a position where the actuator 3 can emit an ultrasonic wave so that an ultrasonic wave transmitted a test area of the test target O or an ultrasonic wave reflected by a defect which may occur in the test area can be detected by the optical fiber sensor 5. For example, the actuators 3 can be disposed so that the actuators 3 surround the test area and the optical fiber sensor 5, as shown in the figures. The actuators 3 and the optical fiber sensor 5 may be constantly attached as parts of the test target O, such as an aircraft structural object, so that an ultrasonic test of the test target O can be performed periodically.

When an ultrasonic test of the test target O is performed, one actuator 3 to emit an ultrasonic wave is selected by operating the input device 2A. Note that, an order of the actuators 3 which emit ultrasonic waves may be preset, and intermittent emission of ultrasonic waves from the plural actuators 3 may be started by operating the input device 2A.

When an ultrasonic wave is emitted from the actuator 3, the emitted ultrasonic wave propagates in the test area of the test target O. When the ultrasonic wave, which propagates in the test target O, reaches the ultrasonic propagating body 4 placed on the test target O, a part of the ultrasonic wave, which propagates in the test target O, propagates in the ultrasonic propagating body 4. Meanwhile, even in the case where the ultrasonic wave has passed the ultrasonic propagating body 4 placed on the test target O, when a defect exists inside the test target O, a part of the ultrasonic reflected wave, which returns by reflecting on the defect, propagates in the ultrasonic propagating body 4.

The ultrasonic propagating body 4, composed of the thin plate 7 or the like, has a structure by which the traveling direction of an ultrasonic wave can be changed. Thereby, the traveling direction of the ultrasonic wave propagating in the test target O changes by the ultrasonic propagating body 4. Specifically, the traveling direction of the ultrasonic wave propagating in the test target O changes toward the length direction of the optical fiber sensor 5. As a result, the ultrasonic wave whose traveling direction has changed by the ultrasonic propagating body 4 can be detected by the optical fiber sensor 5. That is, an ultrasonic wave which propagates in the test target O can be substantially detected by the optical fiber sensor 5.

A vibration waveform of an ultrasonic wave detected by the optical fiber sensor 5 is converted into an optical signal, and output to the signal processing system 6 as an ultrasonic detection signal. In the signal processing system 6, signal processing, such as A/D conversion processing of an optical signal, noise removal processing, averaging processing, envelope detection processing, and peak detection processing, is performed. When averaging processing is performed, an ultrasonic wave is repeatedly emitted from the same actuator 3 the number of times of adding signals. Then, the necessary number of ultrasonic detection signals for the averaging processing are obtained.

When an ultrasonic detection signal has been obtained in the signal processing system 6 with an SNR necessary for detection processing of a defect, the detection processing of a defect can be performed. When a defect exists between one certain actuator 3 and the ultrasonic propagating body 4, a waveform of an ultrasonic wave transmitted the defect becomes a waveform which has been influenced by the defect. Meanwhile, when a defect does not exist between the actuator 3 and the ultrasonic propagating body 4, a waveform of an ultrasonic wave becomes a waveform which is not influenced by a defect. Therefore, a waveform of an ultrasonic wave which is not influenced by a defect can be used as a reference waveform. Then, in the case where an ultrasonic wave having a waveform changed from the reference waveform has been detected, it can be determined that a defect exists between the corresponding actuator 3 and ultrasonic propagating body 4.

When an ultrasonic wave has reflected on a defect inside the test target O, a peak, which is not observed when a defect does not exist, appears in the ultrasonic reflected wave. Thereby, a defect can also be detected by peak detection of an ultrasonic reflected wave. Furthermore, a position of the defect can also be estimated based on a peak time detected from the ultrasonic reflected wave.

As described above, in the ultrasonic test system 1 and the ultrasound test method, the optical fiber sensor 5 used as a sensor for detecting an ultrasonic wave is attached to the test target O through the ultrasonic propagating body 4, such as the thin plate 7 processed into a reverse funnel shape, having a structure which allows changing the traveling direction of an ultrasonic wave.

Effects

Accordingly, the ultrasonic test system 1 and the ultrasonic test method allow obtaining flexibility in placement of the optical fiber sensor 5 having the reception directivity. As a result, even when it is difficult to secure a space for disposing the optical fiber sensor 5, the optical fiber sensor 5 can be disposed with changing a direction of the optical fiber sensor 5.

In addition, the optical fiber sensor 5 can be disposed in a direction where the length direction of the optical fiber sensor 5 is not parallel to the surface of the test target O. Thereby, it becomes possible to detect ultrasonic waves, which propagate in the test target O from a plurality of directions toward the optical fiber sensor 5, by the common optical fiber sensor 5. In particular, when the optical fiber sensor 5 is disposed in a direction where the length direction of the optical fiber sensor 5 becomes perpendicular to the surface of the test target O, ultrasonic waves propagating from all azimuths can be detected by the common optical fiber sensor 5.

Furthermore, when the ultrasonic propagating body 4 is composed of the thin plate 7 having an appropriate thickness, a Lamb wave propagating in the test target O can be detected by the optical fiber sensor 5. Thereby, an ultrasonic wave can be detected with satisfactory accuracy.

Some tests were actually performed by attaching an FBG sensor on a panel made of CFRP with an adhesive in a direction where the length direction of the FBG sensor becomes perpendicular to the surface of the panel. Then, it was compared with the case where an FBG sensor has been attached to a panel in a direction where the length direction of the FBG sensor becomes parallel to the surface of the panel as in the past.

Figure 3:
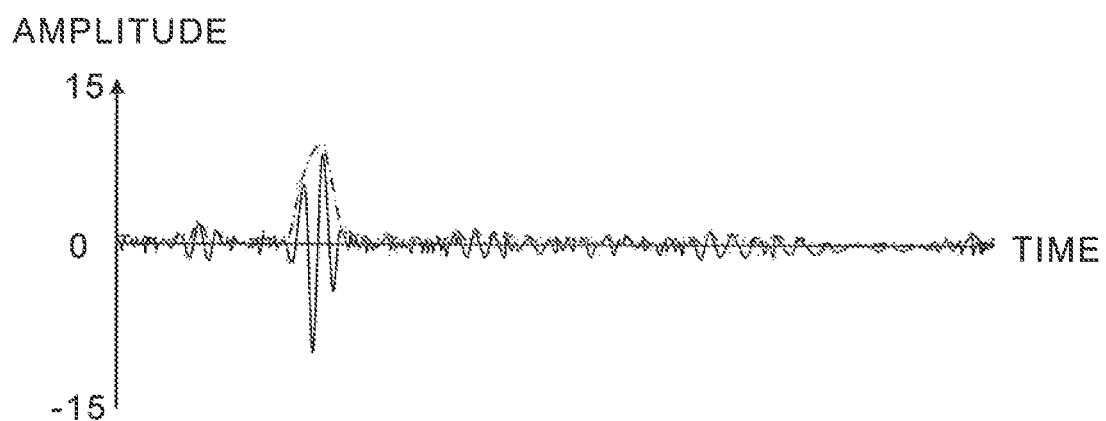
FIG. 3 is a graph showing a detection signal, obtained by an FBG sensor placed in the conventional method so that the length direction of the FBG sensor becomes parallel to the surface of the test target, of a Lamb wave propagating in the test target in the length direction of the PEG sensor.
Figure 4:
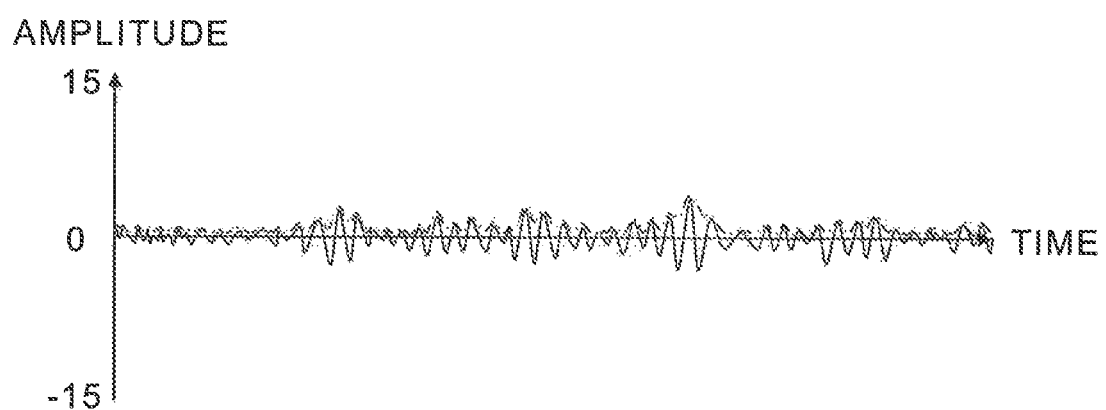
FIG. 4 is a graph showing a detection signal, obtained by an FBG sensor placed in the conventional method so that the length direction of the FBG sensor becomes parallel to the surface of the test target, of a Lamb wave propagating in the test target in a direction perpendicular to the length direction of the FBG sensor.

FIG. 3 is a graph showing a detection signal, obtained by an FBG sensor placed in the conventional method so that the length direction of the FBG sensor becomes parallel to the surface of the test target O, of a Lamb wave propagating in the test target O in the length direction of the FBG sensor. FIG. 4 is a graph showing a detection signal, obtained by an FBG sensor placed in the conventional method so that the length direction of the FBG sensor becomes parallel to the surface of the test target O, of a Lamb wave propagating in the test target O in a direction perpendicular to the length direction of the FBG sensor.

Figure 5:
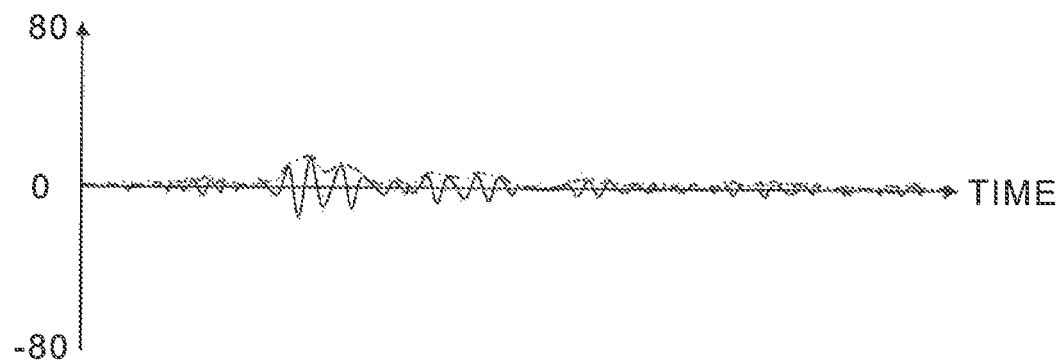
FIG. 5 is a graph showing a detection signal of a Lamb wave propagating in the test target in the first direction, obtained by an FBG sensor placed so that the length direction of the FBG sensor becomes perpendicular to the surface of the test target.
Figure 6:
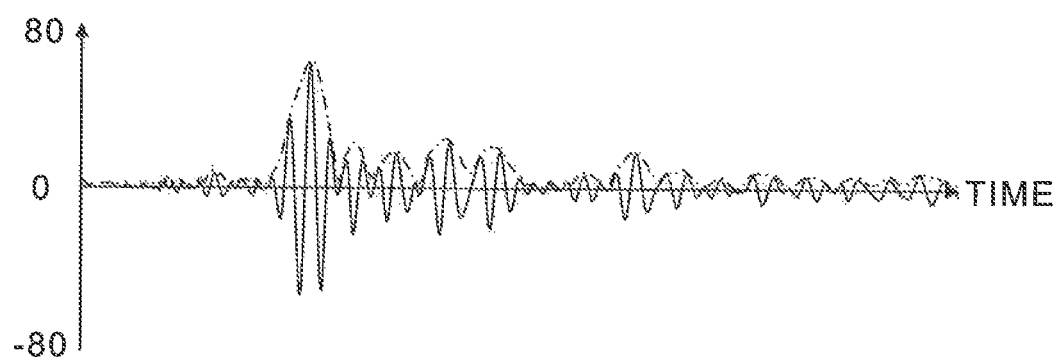
FIG. 6 is a graph showing a detection signal of a Lamb wave propagating in the test target in the second direction perpendicular to the first direction, obtained by an FBG sensor placed so that the length direction of the FBG sensor becomes perpendicular to the surface of the test target.

Meanwhile, FIG. 5 is a graph showing a detection signal of a Lamb wave propagating in the test target O in the first direction, obtained by an FBG sensor placed so that the length direction of the FBG sensor becomes perpendicular to the surface of the test target O. FIG. 6 is a graph showing a detection signal of a Lamb wave propagating in the test target O in the second direction perpendicular to the first direction, obtained by an FBG sensor placed so that the length direction of the FBG sensor becomes perpendicular to the surface of the test target O.

In FIGS. 3-6, each horizontal axis shows relative time while each vertical axis shows relative amplitude of ultrasonic detection signal. Note that, the scale of each vertical axis in FIG. 3 and FIG. 4 differs from the scale of each vertical axis in FIG. 5 and FIG. 6. Specifically, a range of the relative amplitude of each vertical axis in FIG. 3 and FIG. 4 is ±15. Meanwhile, a range of the relative amplitude of each vertical axis in FIG. 5 and FIG. 6 is ±80. Each of the ultrasonic detection signals shown in FIGS. 3-6 was obtained by performing noise removal processing and averaging processing. Each solid line shows a signal before envelope detection while each dashed-dotted line shows a signal after the envelope detection.

When an FBG sensor has been placed in the conventional method so that the length direction of the FBG sensor becomes parallel to the surface of the test target O, the FBG sensor can detect a Lamb wave, which propagates in the length direction of the FBG sensor, in sufficient accuracy as shown in FIG. 3. However, an FBG sensor placed in the conventional method cannot detect a Lamb wave, which propagates in a direction perpendicular to the length direction of the FBG sensor, in sufficient accuracy as shown in FIG. 4.

By contrast, when an FBG sensor has been placed so that the length direction of the FBG sensor becomes perpendicular to the surface of the test target O, it is indicated not only that a Lamb wave which propagates in the test target O in the first direction can be detected in sufficient accuracy as shown in FIG. 5 but also that a Lamb wave which propagates in the test target O in the second direction perpendicular to the first direction can be detected in sufficient accuracy as shown in FIG. 6. Note that, each FBG sensor has been fixed on the surface of the test target O with an adhesive formed in a conic shape. Therefore, it can be confirmed that a Lamb wave can be detected by an FBG sensor perpendicularly attached on the surface of the test target O even when the ultrasonic propagating body 4 is not metal or the like but only an adhesive. That is, it can be confirmed that only an adhesive may be used as the ultrasonic propagating body 4.

First Modification

Figure 7:
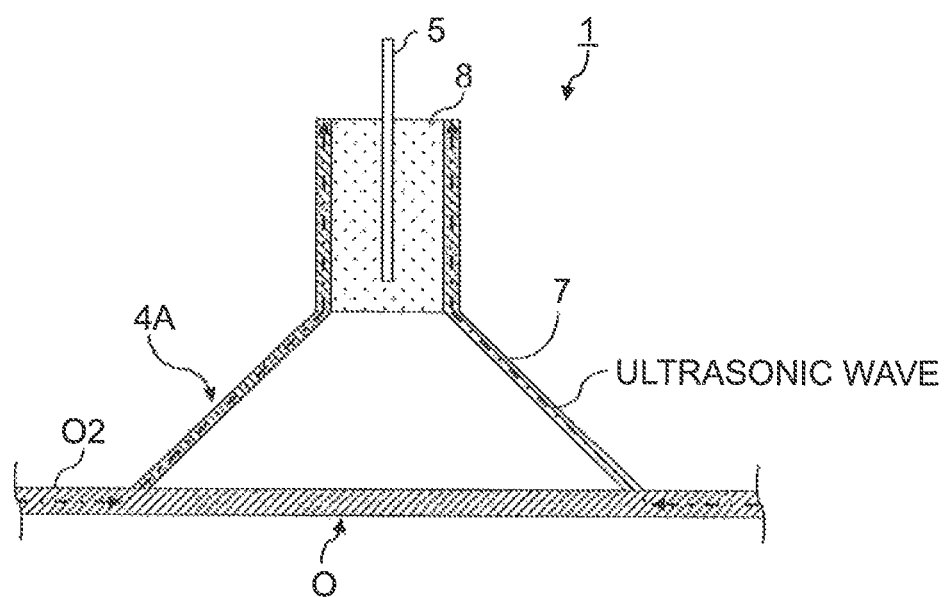
FIG. 7 is a longitudinal sectional view showing another example of structure of the ultrasonic propagating body in the ultrasonic test system according to the first implementation of the present invention.
Figure 8:
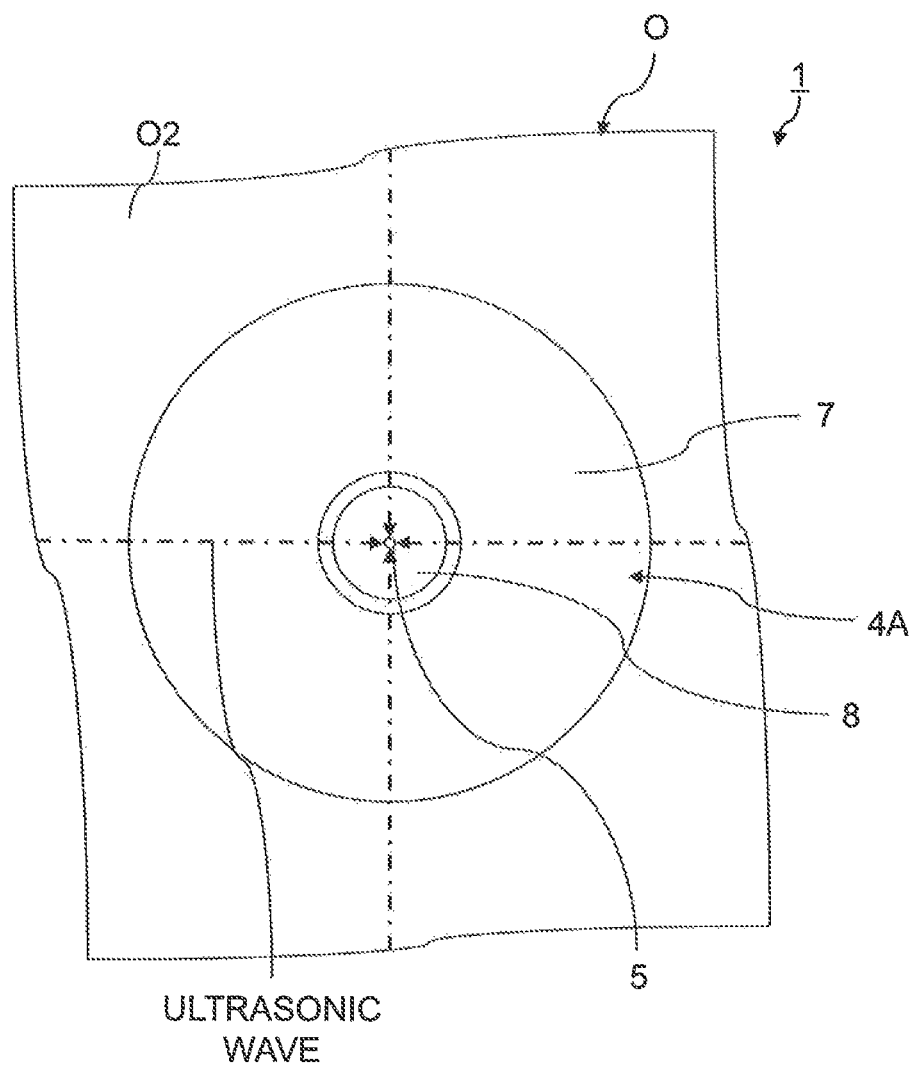
FIG. 8 is a top view showing the structure of the ultrasonic propagating body shown in FIG. 7.

FIG. 7 is a longitudinal sectional view showing another example of structure of the ultrasonic propagating body in the ultrasonic test system according to the first implementation of the present invention. FIG. 8 is a top view showing the structure of the ultrasonic propagating body shown in FIG. 7.

As exemplified in FIG. 7 and FIG. 8, an ultrasonic propagating body 4A may also have a structure in which a cylinder whose outside diameter and inside diameter are constant has been jointed to the tip of a conical shape whose outside diameter and inside diameter become gradually small. That is, a structure of the ultrasonic propagating body 4A can also be a tubular structure in which the test target O side tapers partially. The ultrasonic propagating body 4A having such a structure is easy to be manufactured since the curvature direction is only the circumferential direction although the ultrasonic propagating body 4A has an edge. Note that, the edge may also be removed by R chamfering a coupled portion of the circular cone and the cylinder.

In addition, the end part of the ultrasonic propagating body 4A in the test target O side may also be R chamfered in order to smoothly couple the circular cone portion of the ultrasonic propagating body 4A to the surface of the test target O.

Second Modification

Figure 9:
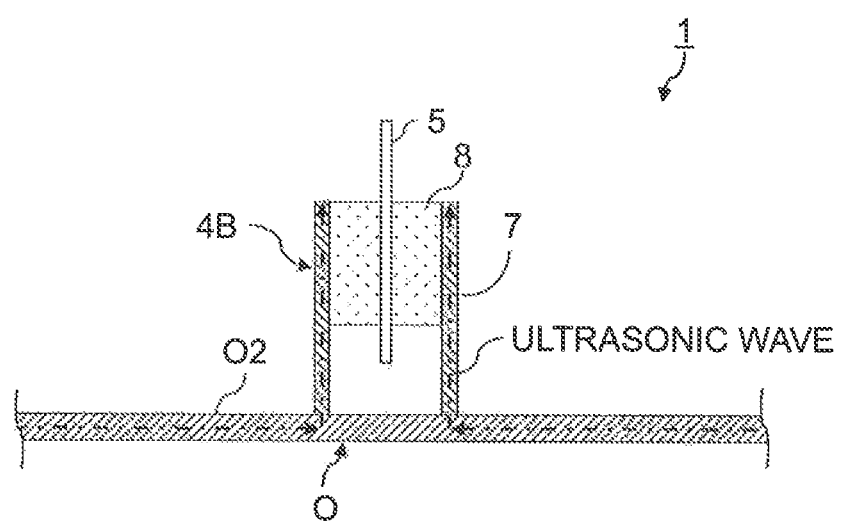
FIG. 9 is a longitudinal sectional view showing further another example of structure of the ultrasonic propagating body in the ultrasonic test system according to the first implementation of the present invention.
Figure 10:
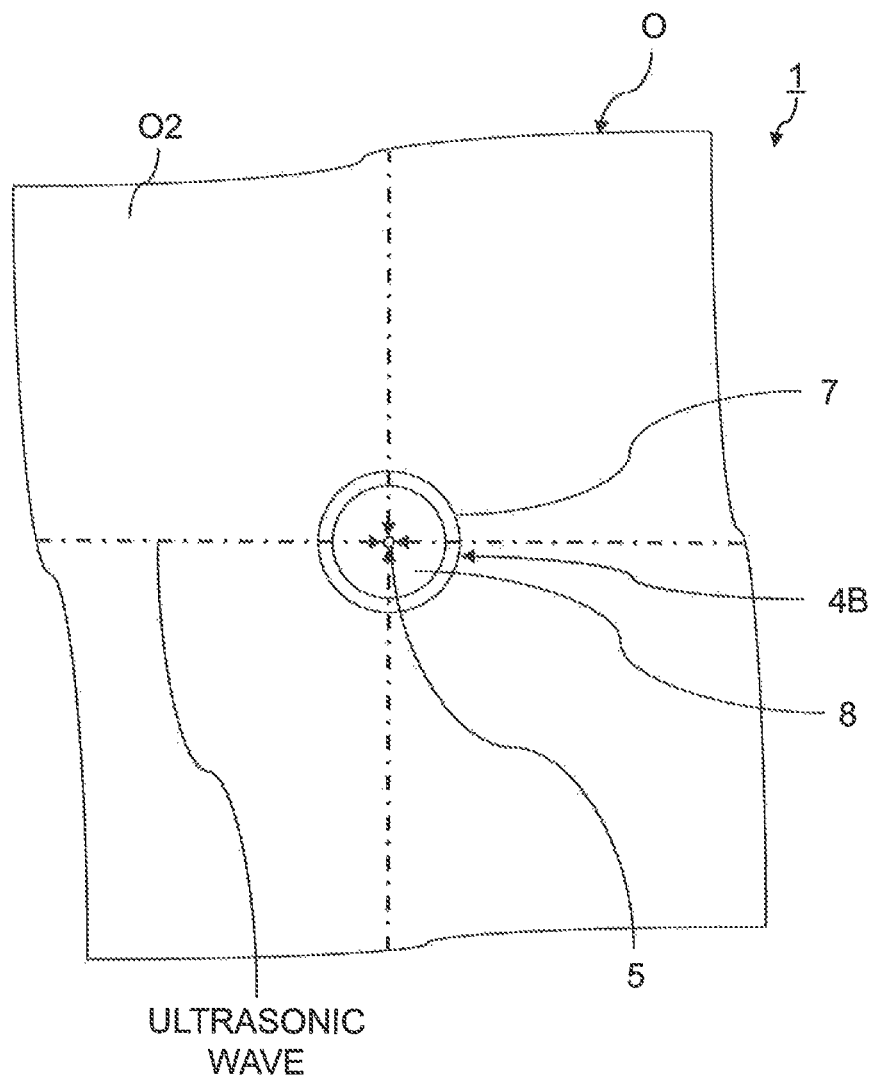
FIG. 10 is a top view showing the structure of the ultrasonic propagating body shown in FIG. 9.

FIG. 9 is a longitudinal sectional view showing further another example of structure of the ultrasonic propagating body in the ultrasonic test system according to the first implementation of the present invention. FIG. 10 is a top view showing the structure of the ultrasonic propagating body shown in FIG. 9.

As exemplified in FIG. 9 and FIG. 10, an ultrasonic propagating body 4B can also have a cylindrical structure whose outside diameter and inside diameter are constant. In this case, the structure of the ultrasonic propagating body 4B becomes very simple. Thereby, manufacturing costs of the ultrasonic propagating body 4B can be further reduced.

Note that, the branch direction of an ultrasonic wave from the test target O to the thin plate 7 composing the ultrasonic propagating body 4B is the right angle. Thus, it is considered to be preferable to snake the thickness direction of the end portion of the thin plate 7 in the test target O side be perpendicular to or inclined at an angle nearly perpendicular to the surface of the test target O as exemplified in FIG. 1 and FIG. 7, from a viewpoint of improving detection accuracy of ultrasonic wave by satisfactorily propagating the ultrasonic wave in the thin plate 7.

Second Implementation

Figure 11:
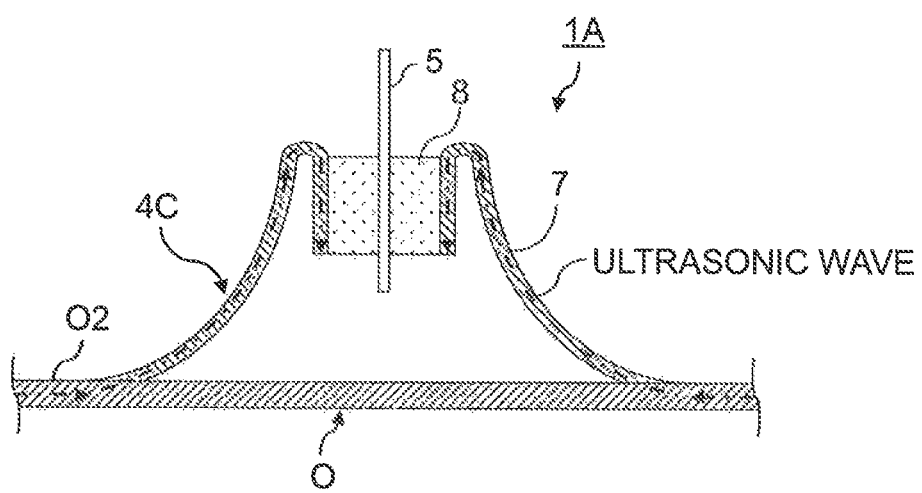
FIG. 11 is a longitudinal sectional view showing structures of an optical fiber sensor and an ultrasonic propagating body included in an ultrasonic test system according to the second implementation of the present invention.
Figure 12:
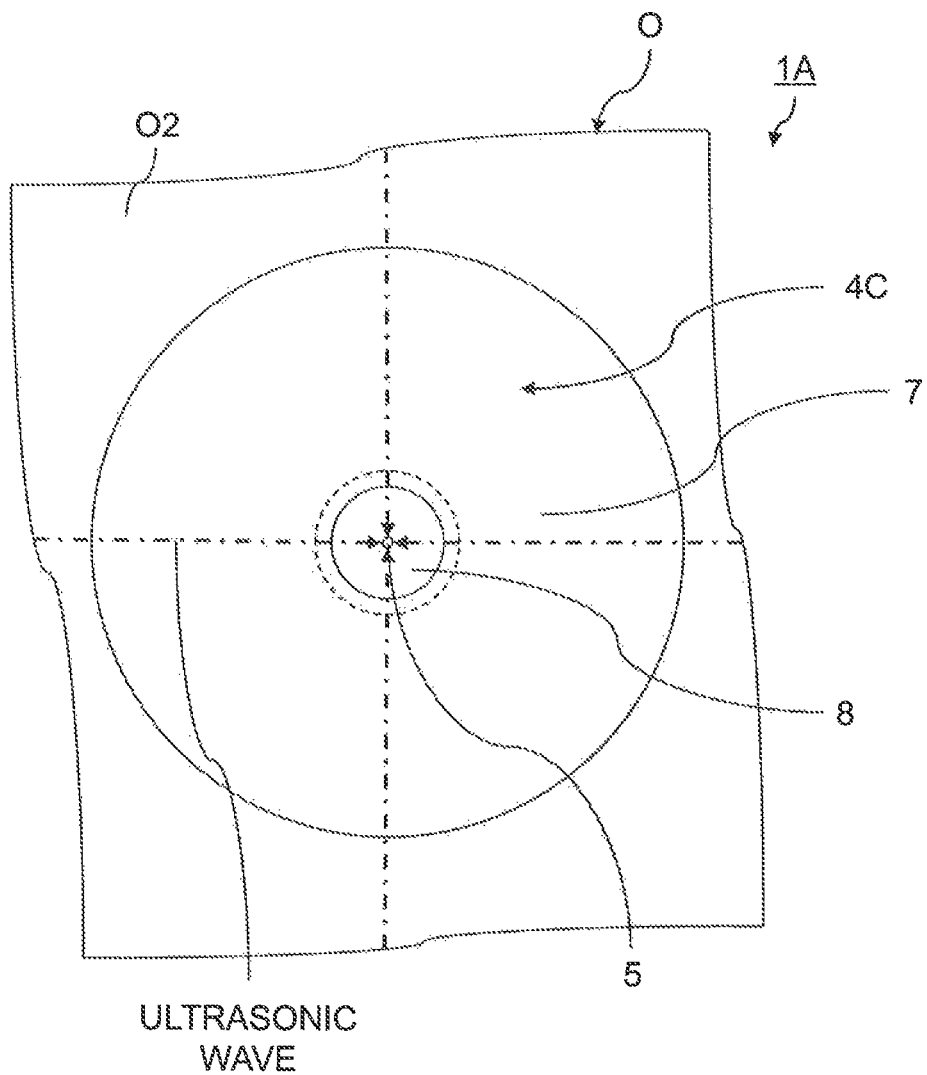
FIG. 12 is a top view of the optical fiber sensor and the ultrasonic propagating body of the ultrasonic test system shown in FIG. 11.

FIG. 11 is a longitudinal sectional view showing structures of an optical fiber sensor and an ultrasonic propagating body included in an ultrasonic test system according to the second implementation of the present invention. FIG. 12 is a top view of the optical fiber sensor and the ultrasonic propagating body of the ultrasonic test system shown in FIG. 11.

An ultrasonic test system 1A in the second implementation shown in FIG. 11 and FIG. 12 is different from the ultrasonic test system 1 in the first implementation in a structure of the ultrasonic propagating body 4C. Other structures and functions of the ultrasonic test system 1A in the second implementation are not substantially different from those of the ultrasonic test system 1 in the first implementation. Therefore, only elements representing features are shown in the figures, and the same structures or corresponding structures are shown by the same signs with their explanations omitted.

The ultrasonic propagating body 4C of the ultrasonic test system 1A in the second implementation is composed of the cylindrical thin plate 7 whose inside diameter and outside diameter gradually become small from the test target O side toward the optical fiber sensor 5 side, and the ultrasonic propagating body 4C has a structure in which the end portion of the cylindrical thin plate 7, in the side where the inside diameter and the outside diameter are small, has been curved inside. Thereby, the traveling direction of a Lamb wave which propagates in the test target O can be changed to the curvature direction of the thin plate 7.

As described above, when the ultrasonic propagating body 4C has a structure in which the tip of the reverse funnel-shaped cylinder has been folded back inside, the height of the ultrasonic propagating body 4C can be lowered. Thereby, the effect that the optical fiber sensor 5 can be placed even at a narrower space can be obtained in the second implementation, in addition to the effects similar to those in the first implementation. As a matter of course, the ultrasonic propagating body 4A exemplified in FIG. 7 or the ultrasonic propagating body 4B exemplified in FIG. 9 can also have a structure in which the tip of the ultrasonic propagating body 4A or the ultrasonic propagating body 4B has been folded back inside.

Third Implementation

Figure 13:
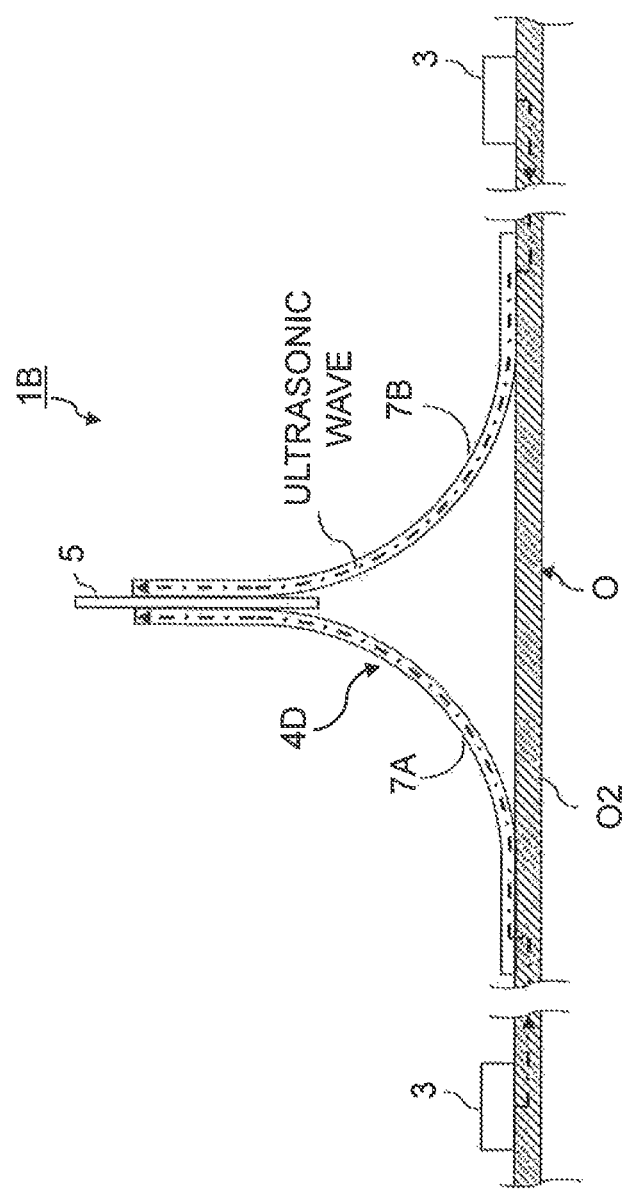
FIG. 13 is a front view showing structures of main elements which represent features of an ultrasonic test system according to the third implementation of the present invention.
Figure 14:
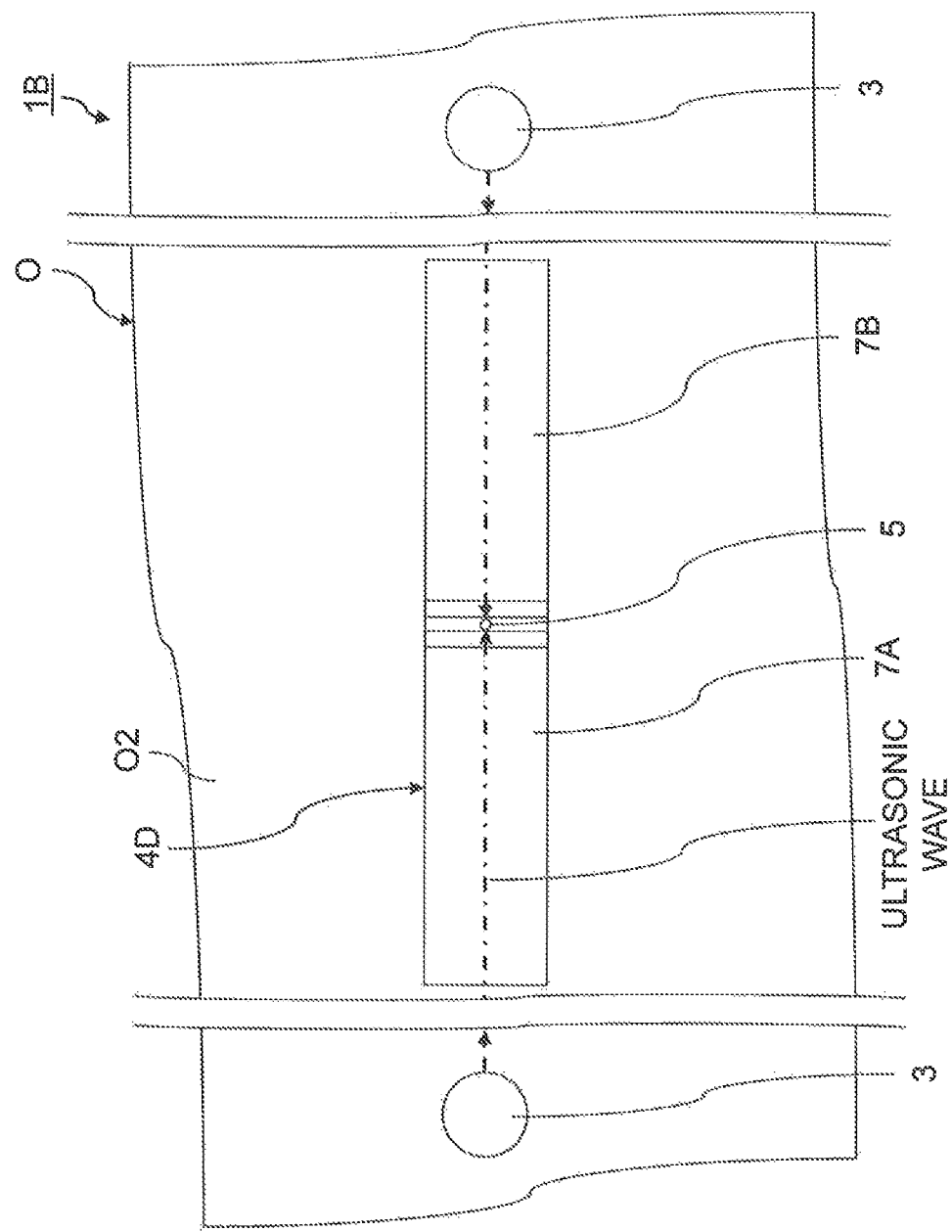
FIG. 14 is a top view of the main elements of the ultrasonic test system shown in FIG. 13.

FIG. 13 is a front view showing structures of main elements which represent features of an ultrasonic test system according to the third implementation of the present invention. FIG. 14 is a top view of the main elements of the ultrasonic test system shown in FIG. 13.

An ultrasonic test system 1B in the third implementation shown in FIG. 13 and FIG. 14 is different from the ultrasonic test system 1 in the first implementation in a structure of the ultrasonic propagating body 4D. Other structures and functions of the ultrasonic test system 1B in the third implementation are not substantially different from those of the ultrasonic test system 1 in the first implementation. Therefore, only elements representing features are shown in the figures, and the same structures or corresponding structures are shown by the same signs with their explanations omitted.

The ultrasonic propagating body 4D of the ultrasonic test system 1B in the third implementation is composed of plural thin plates 7A, 7B in which inclined angles of the thickness directions to the surface of the test target O change respectively. Specifically, each of the thin plates 7A, 7B has been curved so that the thickness direction changes from the test target O side toward the optical fiber sensor 5 side. Thereby, the traveling directions of Lamb waves which propagate in the test target O from a plurality of directions can be changed by the thin plates 7A, 7B respectively.

Therefore, the traveling directions of ultrasonic waves, which propagate in the test target O from a plurality of directions, can also be changed to the same direction according to the reception directivity of the optical fiber sensor 5, by the ultrasonic propagating body 4D in the third implementation. For example, the traveling directions of Lamb waves can be changed to the length direction of the optical fiber sensor 5 which has been disposed to be perpendicular to the surface of the test target O as shown in FIG. 13.

In the example shown in FIG. 13 and FIG. 14, the ultrasonic propagating body 4D is composed of the two thin plates 7A, 7B so that Lamb waves which propagate from two directions can be led to the optical fiber sensor 5. Note that, the ultrasonic propagating body 4D may also be composed of not less than three thin plates 7 so that Lamb waves which propagate from a plurality of directions of not less than three directions can be led to the optical fiber sensor 5. It has been empirically confirmed that when the width of the thin plate 7 is not less than the wavelength of a Lamb wave, the Lamb wave can propagate in a state where the characteristics of the Lamb wave have been kept.

The thin plates 7 may be made to contact with each other, and the optical fiber sensor 5 may be attached to either one of the thin plates 7 with a tape or an adhesive. In that case, only the thin plate 7 to which the optical fiber sensor 5 is attached may protrude in the optical fiber sensor 5 side.

Alternatively, the flat thin plate 7 may be bent so as to be inclined to the surface of the test target O, instead of curving the thin plate 7. That is, the ultrasonic propagating body 4D can also be composed of a plurality of thin plates 7 of which each thickness direction is not perpendicular to the surface of the test target O. As a specific example, the ultrasonic propagating body 4D can be composed so that a section becomes a reverse Y shape. In that case, a portion to be bent may also be R chamfered so that any sharp edge is not formed.

First Modification

Figure 15:
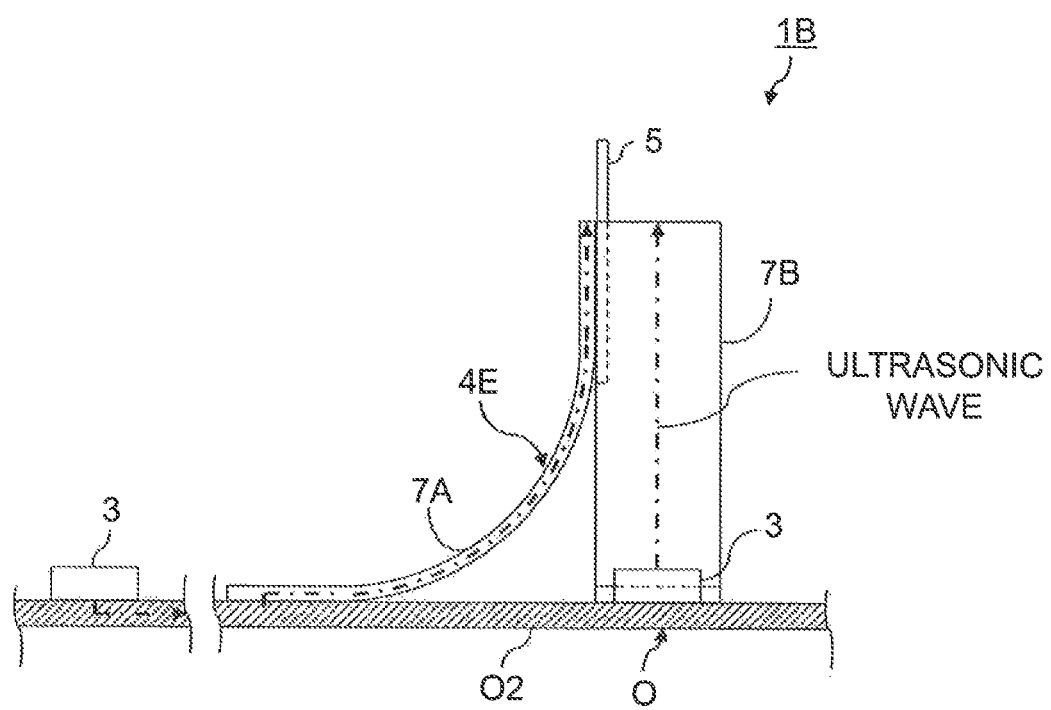
FIG. 15 is a longitudinal sectional view showing another example of structure of the ultrasonic propagating body in the ultrasonic test system according to the third implementation of the present invention.
Figure 16:
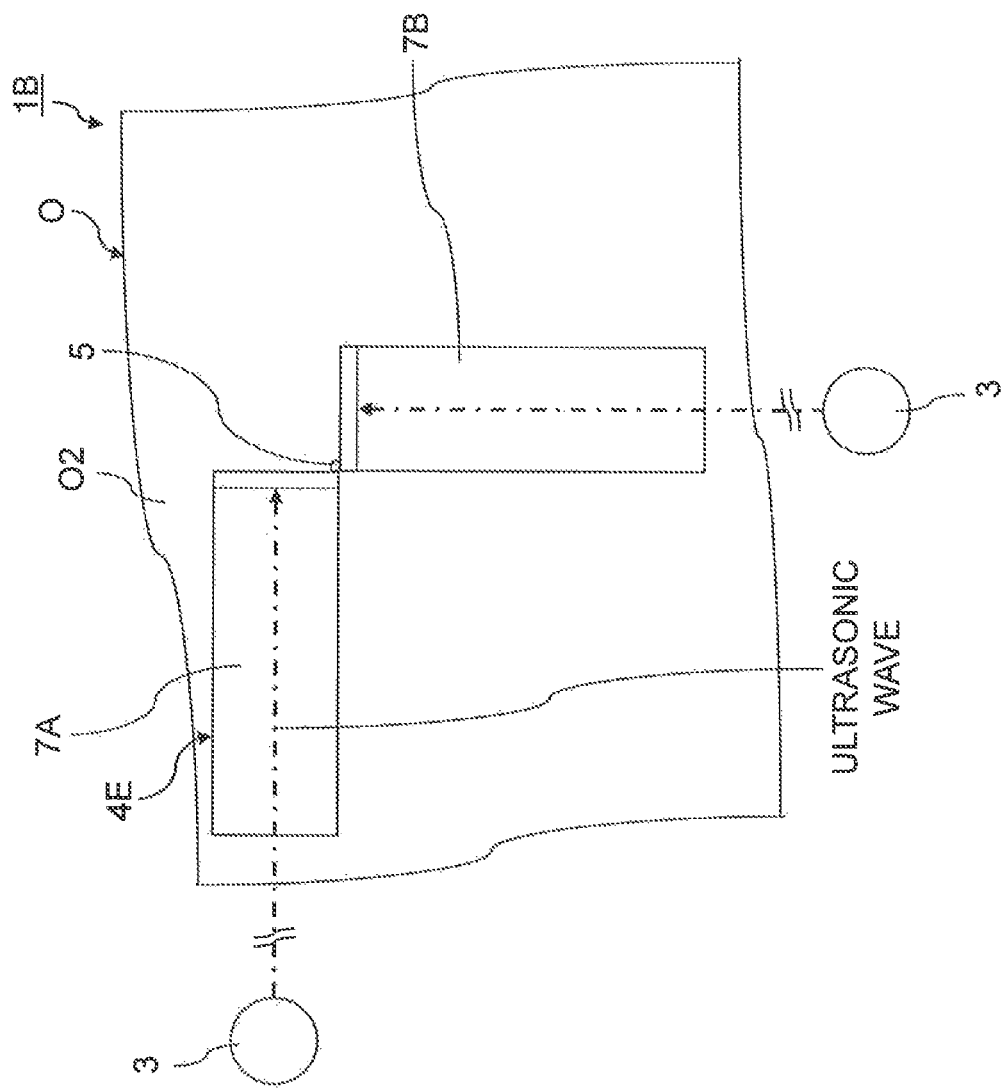
FIG. 16 is a top view showing the structure of the ultrasonic propagating body shown in FIG. 15.

FIG. 15 is a longitudinal sectional view showing another example of structure of the ultrasonic propagating body in the ultrasonic test system according to the third implementation of the present invention. FIG. 16 is a top view showing the structure of the ultrasonic propagating body shown in FIG. 15.

As exemplified in FIG. 15 and FIG. 16, the plural thin plates 7A, 7B can also be disposed, as the ultrasonic propagating body 4E, in directions which are not symmetric with respect to the length direction of the optical fiber sensor 5 as an axis. That is, each width direction of the thin plates 7A, 7B can be directed toward a desired direction. Thereby, Lamb waves, which propagate from specific directions, can be selectively detected by the optical fiber sensor 5. The similar applies to a case of disposing not less than three thin plates 7.

Second Modification

Figure 17:
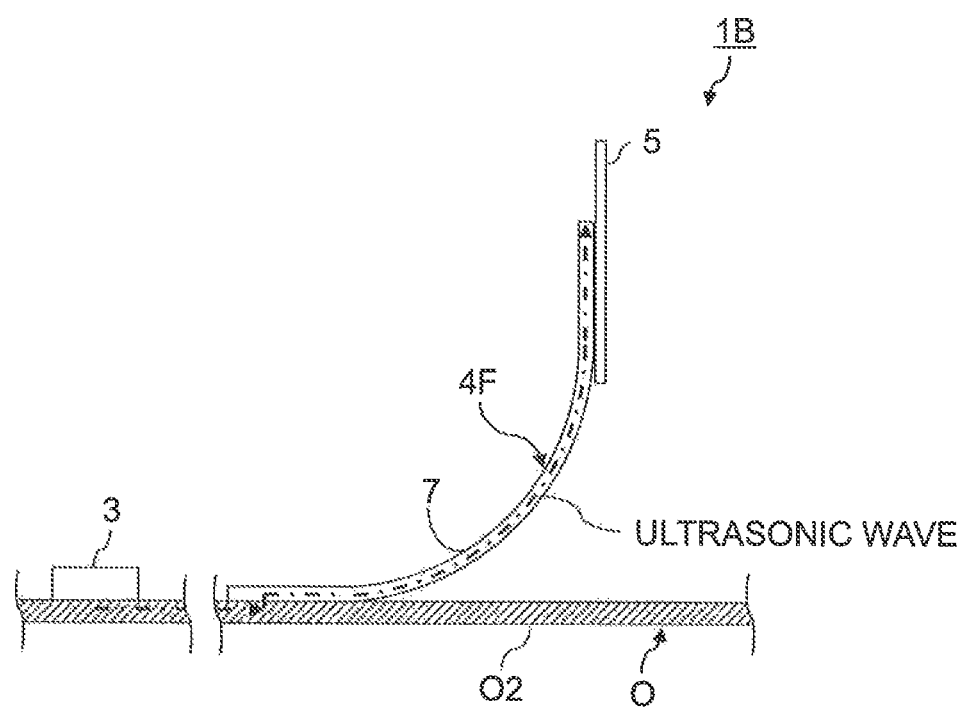
FIG. 17 is a longitudinal sectional view showing further another example of structure of the ultrasonic propagating body in the ultrasonic test system according to the third implementation of the present invention.
Figure 18:
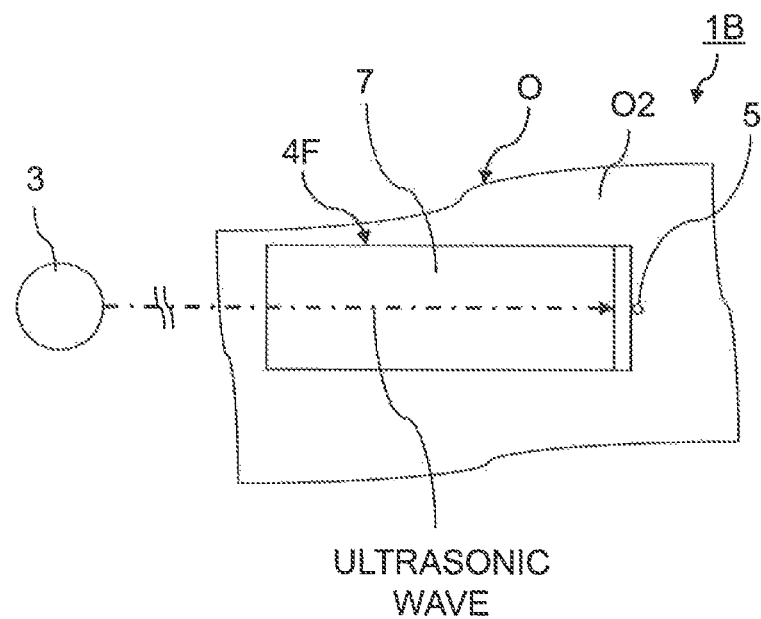
FIG. 18 is a top view showing the structure of the ultrasonic propagating body shown in FIG. 17.

FIG. 17 is a longitudinal sectional view showing further another example of structure of the ultrasonic propagating body in the ultrasonic test system according to the third implementation of the present invention. FIG. 18 is a top view showing the structure of the ultrasonic propagating body shown in FIG. 17.

As exemplified in FIG. 17 and FIG. 18, a Lamb wave which propagates from one direction may be detected by the optical fiber sensor 5 through one curved thin plate 7 as an ultrasonic propagating body 4F. As a matter of course, the ultrasonic propagating body 4F may also be composed by bending the flat thin plate 7, instead of curving the thin plate 7. In this case, the optical fiber sensor 5 can be disposed in a desired direction even at a narrow space for detecting a Lamb wave from one direction. That is, even when the optical fiber sensor 5 cannot be disposed by the conventional method, the optical fiber sensor 5 can be disposed.

Fourth Implementation

Figure 19:
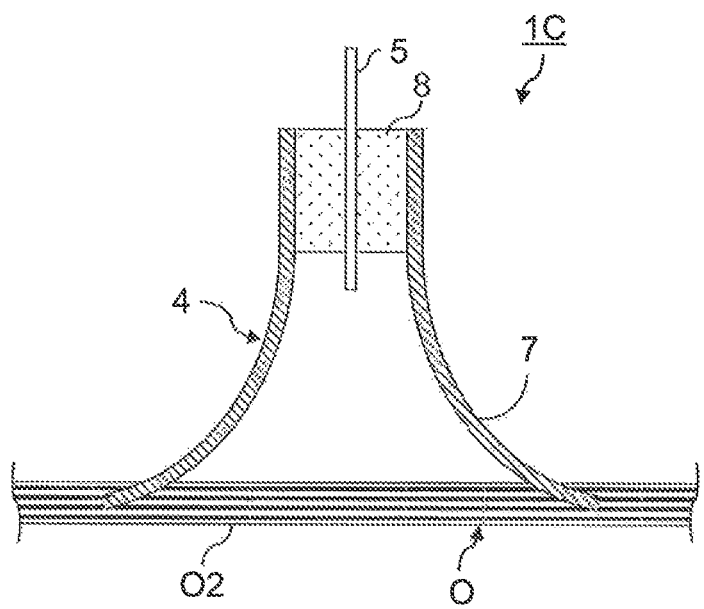
FIG. 19 shows structures of main elements which represent features of an ultrasonic test system according to the fourth implementation of the present invention.

FIG. 19 shows structures of main elements which represent features of an ultrasonic test system according to the fourth implementation of the present invention.

An ultrasonic test system 1C in the fourth implementation shown in FIG. 19 is different from the ultrasonic test system 1 in the first implementation, in a point that a part of the ultrasonic propagating body 4 has been embedded in the test target O. Other structures and functions of the ultrasonic test system 1C in the fourth implementation are not substantially different from those of the ultrasonic test system 1 in the first implementation. Therefore, only main elements representing features are shown in the figure, and the same structures or corresponding structures are shown by the same signs with their explanations omitted.

When the test target O is a composite material, the end portion of the thin plate 7 composing the ultrasonic propagating body 4 can be placed between sheet-like prepregs at the time of laminating the prepregs. Specifically, the thin plate 7 is placed on a laminated body of some prepregs. Subsequently, other prepregs are laminated on the end portion of the thin plate 7. Thereby, the end portion of the thin plate 7 can be inserted between the prepregs. After that, the laminated body of prepregs is cured in a state where the end portion of the thin plate 7 has been sandwiched. Thereby, the thin plate 7 made of a metal or a composite material can be integrated with the test target O made of a composite material.

Thereby, in the fourth implementation, an ultrasonic wave, such as a Lamb wave, which propagates inside the test target O can satisfactorily propagate in the thin plate 7. Furthermore, the ultrasonic propagating body 4 can be firmly fixed to the test target O. Thus, the fourth implementation is especially effective when it is difficult to attach the ultrasonic propagating body 4 to the test target O after attaching a variety of parts.

As a matter of course, the thin plate 7 having a structure exemplified as another implementation or a modification can also be embedded in the test target O.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, in each of the above-mentioned implementations, an example case of detecting a defect, such as damage or peeling, in a test region of the test target O by emitting an ultrasonic wave from the actuator 3 has been described. Alternatively, a defect, such as damage, in a test region of the test target O may be detected by detecting an ultrasonic wave arisen in the test target O. As a specific example, a defect in a test region of the test target O can also be detected by detecting an AE (acoustic emission), emitted when deformation or fracture occurs inside a composite material or the like, by the optical fiber sensor 5.

Alternatively, the actuator 3 may be disposed near the ultrasonic propagating body 4, and an ultrasonic wave may be transmitted from the actuator 3 toward a direction away from the ultrasonic propagating body 4. Then, an ultrasonic reflected wave, which has reflected on a defect, may be detected by the optical fiber sensor 5.

Furthermore, according to the results of the evaluation tests shown in FIG. 5 and FIG. 6, it can be confirmed that a Lamb wave can be detected by the optical fiber sensor 5 even without interposing the ultrasonic propagating body 4, 4A, 4B, 4C, 4D, 4E or 4F. Thus, the optical fiber sensor 5 may be disposed on the surface of the test target O in a direction where the length direction of the optical fiber sensor 5 is not parallel to the surface of the test target O, without interposing the ultrasonic propagating body 4, 4A, 4B, 4C, 4D, 4E or 4F. Then, an ultrasonic wave, which propagates in the test target O, may be detected by the optical fiber sensor 5.

What is claimed is:

1. An ultrasonic test system comprising:
    an ultrasonic propagating body that changes at least one traveling direction of at least one ultrasonic wave which propagates through a region in a test target that is being tested for an anomaly and is received by the ultrasonic propagating body after propagating in the test target through the region; and
    an optical fiber sensor that detects the at least one ultrasonic wave of which the at least one traveling direction has been changed by the ultrasonic propagating body, and
    wherein the at least one ultrasonic wave is at least one Lamb wave; and
    the ultrasonic propagating body has a structure in which an end portion of a cylindrical thin plate has been curved inside, an inside diameter and an outside diameter of the cylindrical thin plate gradually becoming small from a test target side toward an optical fiber sensor side, the end portion being in a side where the inside diameter and the outside diameter are small.

2. The ultrasonic test system according to claim 1,
    wherein the at least one ultrasonic wave comprises ultrasonic waves which propagate in the test target from a plurality of directions; and
    the ultrasonic propagating body changes traveling directions of the ultrasonic waves to a same direction according to reception directivity of the optical fiber sensor.

3. The ultrasonic test system according to claim 1,
    wherein the ultrasonic propagating body changes the at least one traveling direction of the at least one ultrasonic wave to a length direction of the optical fiber sensor.

4. The ultrasonic test system according to claim 1,
    wherein the optical fiber sensor is attached to the test target through the ultrasonic propagating body in a direction where a length direction of the optical fiber sensor is not parallel to a surface of the test target.

5. The ultrasonic test system according to claim 1, further comprising:
    an ultrasonic transducer that emits the at least one ultrasonic wave toward the test target and the ultrasonic propagating body; and
    a signal processing system that detects a defect of the test target based on a detection signal of the at least one ultrasonic wave, the detection signal having been detected by the optical fiber sensor.

6. The ultrasonic test system according to claim 1,
    wherein a thickness of the thin plate is not more than ½ of a wavelength of the at least one Lamb wave.

7. An aircraft structural object to which the ultrasonic test system according to claim 1 has been attached.

8. An ultrasonic test method utilizing the test system of claim 1, comprising:
    changing at least one traveling direction of at least one ultrasonic wave by disposing the ultrasonic propagating body on the test target that is being tested for an anomaly, the at least one ultrasonic wave propagating through the region being tested for an anomaly in the test target and being received by the ultrasonic propagating body after propagating in the test target through the region; and
    detecting the at least one ultrasonic wave, of which the at least one traveling direction has been changed by the ultrasonic propagating body, with the optical fiber sensor.

9. The ultrasonic test system method according to claim 8,
    wherein the optical fiber sensor is attached to the test target through the ultrasonic propagating body in a direction where a length direction of the optical fiber sensor is not parallel to a surface of the test target.

10. An ultrasonic test system comprising:
    an ultrasonic propagating body that changes at least one traveling direction of at least one ultrasonic wave which propagates through a region in a test target that is being tested for an anomaly and is received by the ultrasonic propagating body after propagating in the test target through the region; and
    an optical fiber sensor that detects the at least one ultrasonic wave of which the at least one traveling direction has been changed by the ultrasonic propagating body, and
    wherein the at least one ultrasonic wave includes Lamb waves which propagate in the test target from a plurality of directions; and
    the ultrasonic propagating body comprises thin plates of which each thickness direction is not perpendicular to a surface of the test target or of which an inclined angle of each thickness direction to the surface of the test target changes, the thin plates changing traveling directions of the Lamb waves respectively.

11. An ultrasonic test method utilizing the test system of claim 10, comprising:
    disposing the optical fiber sensor on a surface of a test target in a direction where a length direction of the optical fiber sensor is not parallel to the surface of the test target; and
    detecting at least one ultrasonic wave by the optical fiber sensor, the at least one ultrasonic wave propagating through the region being tested for an anomaly in the test target and being received by an ultrasonic propagating body after propagating in the test target through the region.

12. The ultrasonic test system according to claim 10,
    wherein
    the ultrasonic propagating body changes traveling directions of the ultrasonic waves to a same direction according to reception directivity of the optical fiber sensor.

13. The ultrasonic test system according to claim 10, wherein the ultrasonic propagating body changes the at least one traveling direction of the at least one ultrasonic wave to a length direction of the optical fiber sensor.

14. The ultrasonic test system according to claim 10, further comprising:
an ultrasonic transducer that emits the at least one ultrasonic wave toward the test target and the ultrasonic propagating body; and
a signal processing system that detects a defect of the test target based on a detection signal of the at least one ultrasonic wave, the detection signal having been detected by the optical fiber sensor.

15. An aircraft structural object to which the ultrasonic test system according to claim 10 has been attached.

16. The ultrasonic test system according to claim 10, wherein a thickness of each thin plate is not more than ½ of a wavelength of the at least one Lamb wave.

\* \* \* \* \*